(No Model.)

G. SPALDING & J. S. ROBBINS.
ROTARY PLOW.

No. 563,515.  Patented July 7, 1896.

WITNESSES:
Baldwin Vale
Joseph R. Power

INVENTORS
George Spalding
John S. Robbins
BY
Boone & Murdock
ATTORNEYS

UNITED STATES PATENT OFFICE.

GEORGE SPALDING AND JOHN S. ROBBINS, OF STOCKTON, CALIFORNIA.

ROTARY PLOW.

SPECIFICATION forming part of Letters Patent No. 563,515, dated July 7, 1896.

Application filed November 11, 1895. Serial No. 568,600. (No model.)

*To all whom it may concern:*

Be it known that we, GEORGE SPALDING and JOHN S. ROBBINS, citizens of the United States, residing at Stockton, in the county of San Joaquin and State of California, have invented certain new and useful Improvements in Rotary Plows; and we do hereby declare the following to be a full, clear, and exact description of said invention, such as will enable others skilled in the art to which it most nearly appertains to make, use, and practice the same.

This invention relates to improvements in rotary plows, and more particularly to the cutting-disks thereof.

The objects which this invention has in view are to form a rotary cutting-disk which will be constantly sharpened as it wears away, and at the same time reduce friction thereon, and to so mount the said disks as to produce a greater efficiency. Heretofore these disks have been constructed of plate-steel stamped or spun to a disk shape, with the outer edge drawn to sharp cutting edge. They have been set in suitable bracket-bearings to hold the face of the cutting edge perpendicular to the ground and turned at an angle to the line of draft. In forming the cutting edge the outer wall has been rounded under the impression that added strength was thereby given this part of the blade. This construction we have discovered is objectionable for the reason the rounded edge throws an amount of friction on the disks on the landside and at the forward edge, where it acts as a brake on the disks and tends to lift them out of the ground.

This invention consists in forming on the cutting-disks a cutting edge the back of which is straight with the line of draft to form a "landside."

Figure 1:
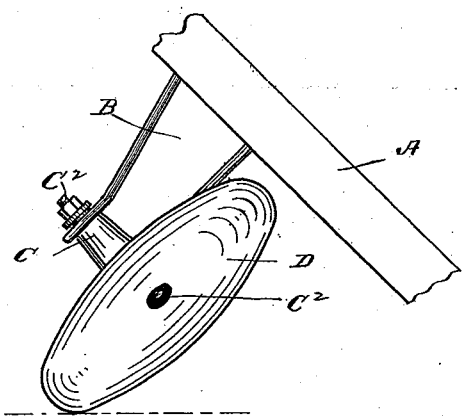
Figure 2:
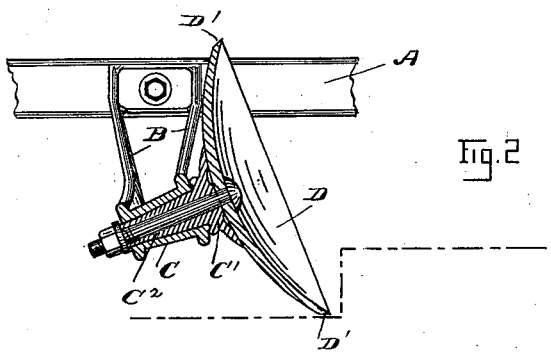
Figure 3:
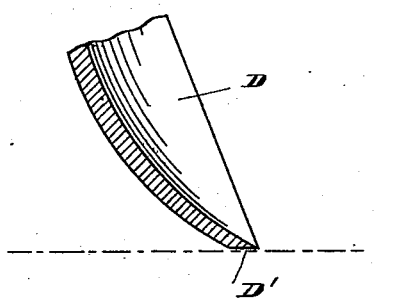

In the drawings, Figure 1 is a plan view of a cutting-disk constructed in accordance with this invention, showing it attached to a section of a draft-beam of the plow. Fig. 2 is a vertical section of the disk and its bearing, taken on the line X X in Fig. 1. Fig. 3 is an enlarged view in section to show the manner of forming the cutting edge.

For the purpose of description, with reference to the drawings, we will let the letter A designate the draft-beam of the plow. To this is secured the brackets B, which are constructed in the forms of two arms, which engage the ends of the bearing C. The arms are twisted to incline the bearing upward to its forward end. In the bearing is mounted a journal C', the forward end of which is flared and made bell-shaped to receive the back of the disk D. The disks are held in the flared end of the journal C' by the bolt $C^2$.

To counteract the side thrust of the disks, they are squared at D' on the back next to the cutting edge in the line of draft. This squared portion D' produces in these disks the same effect as produced by the landside of the ordinary or moldboard plow. At the same time by thus forming the back of the edge to the line of draft the friction now produced by the rounded construction is overcome. Further, by this construction the disks are automatically sharpened by reason of the wear on the squared portion D' wearing evenly away, and the angle to the incline of the face of the disk remains constant.

Having thus described this invention, what we claim is—

1. In a rotary plow the combination of a beam set at an angle to the line of draft with a bracket mounted rigidly on said beam, a rotary cutting-disk having a concave face and a beveled periphery the bevel being formed on the back of the disk and to the line of draft of the plow to form a landside, and a bearing for said disk mounted in said bracket, substantially as described.

2. In a rotary plow a cutting-disk having a solid concave face to operate at an angle to the line of draft and beveled on the back at the periphery of the disk to form a landside, substantially as described.

In testimony whereof we have hereunto set our hands this 5th day of November, 1895.

GEORGE SPALDING.
JOHN S. ROBBINS.

Witnesses:
BALDWIN VALE,
E. F. MURDOCK.